US012611992B2

(12) United States Patent
Ottlik et al.

(10) Patent No.: US 12,611,992 B2
(45) Date of Patent: Apr. 28, 2026

(54) CENTER CONSOLE FOR A VEHICLE

(71) Applicant: Ford Global Technologies, LLC, Dearborn, MI (US)

(72) Inventors: Bernd Ottlik, Pulheim (DE); Robin Advena, Cologne (DE); Martin Erich Huebner, Bergisch Gladbach (DE); Tim Klausmann, Heinsberg (DE); Marc Bisdorf, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 18/494,284

(22) Filed: Oct. 25, 2023

(65) Prior Publication Data

US 2024/0166135 A1 May 23, 2024

(30) Foreign Application Priority Data

Nov. 17, 2022 (DE) .......................... 102022130413.2

(51) Int. Cl.
*B60R 7/04* (2006.01)
*B60N 2/75* (2018.01)
*B60R 11/00* (2006.01)

(52) U.S. Cl.
CPC .............. *B60R 7/04* (2013.01); *B60N 2/793* (2018.02); *B60R 2011/0014* (2013.01)

(58) Field of Classification Search
CPC .............. B60R 7/04; B60R 2011/0007; B60R 2011/0014; B60R 2011/0059; B60R 2011/0061; B60R 2011/0078; B60N 2/793; B60N 3/103; B60N 2/753; B60N 3/10

USPC ....................... 296/24.34, 24.44, 34.46, 37.8
See application file for complete search history.

(56) References Cited

U.S. PATENT DOCUMENTS

| | | | | |
|---|---|---|---|---|
| 6,045,173 | A * | 4/2000 | Tiesler ..................... | B60R 7/04 |
| | | | | 296/153 |
| 7,237,816 | B1 | 7/2007 | Singh et al. | |
| 7,784,843 | B2 * | 8/2010 | Lota ...................... | B60N 3/102 |
| | | | | 296/37.8 |
| 2015/0352993 | A1 * | 12/2015 | Bosma .................. | B60N 3/103 |
| | | | | 224/544 |
| 2017/0259749 | A1 * | 9/2017 | Okinaga .................. | B60R 7/04 |

(Continued)

FOREIGN PATENT DOCUMENTS

| | | |
|---|---|---|
| CN | 110871728 A | 3/2020 |
| JP | 2012140087 A | 7/2012 |

*Primary Examiner* — Roger L Pang
(74) *Attorney, Agent, or Firm* — Vichit Chea; Price Heneveld LLP

(57) ABSTRACT

A center console for a vehicle has an armrest in a rearward region which is pivotable at a rearward end about a pivot axis, extending between a horizontal armrest position and a vertical opening position, an upwardly open storage chamber arranged to be partially forwardly offset in relation to the armrest situated in the horizontal armrest position, a storage insert configured to be at least partially inserted, from above, into the storage chamber, and a securing unit for securing the storage insert within the storage chamber in a vertical direction of the center console. The securing unit has a securing receptacle and a securing projection that engages into the securing receptacle. A forward end portion of the armrest situated in the horizontal armrest position lies on a rearward end portion of the storage insert that has been inserted into the storage chamber.

15 Claims, 7 Drawing Sheets

(56) References Cited

U.S. PATENT DOCUMENTS

2017/0282807 A1* 10/2017 Sahs ...................... B60Q 7/00
2019/0092243 A1*  3/2019 Perez ..................... B60R 11/02

* cited by examiner

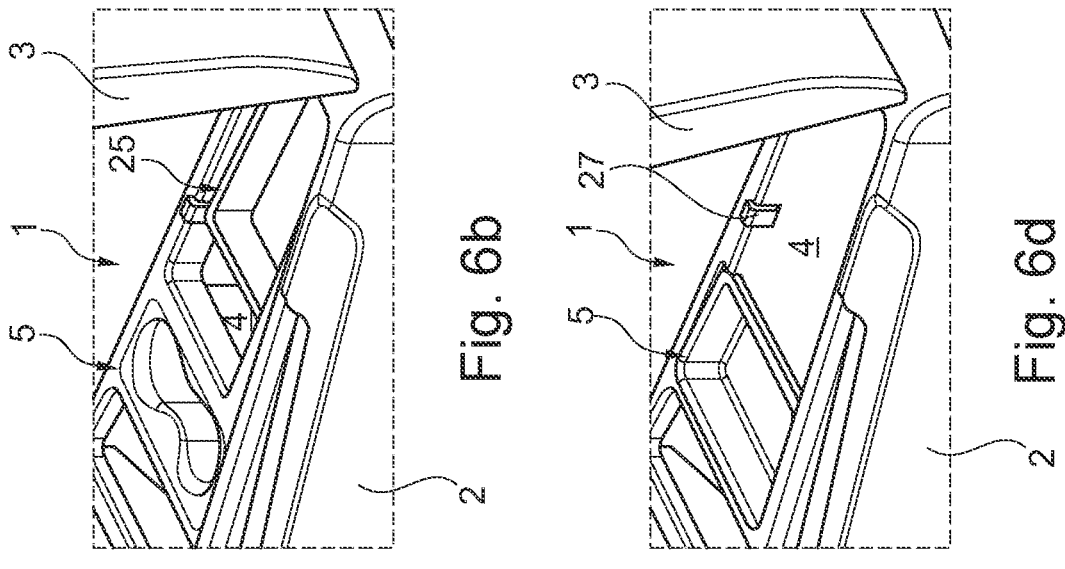
Fig. 6a
Fig. 6b
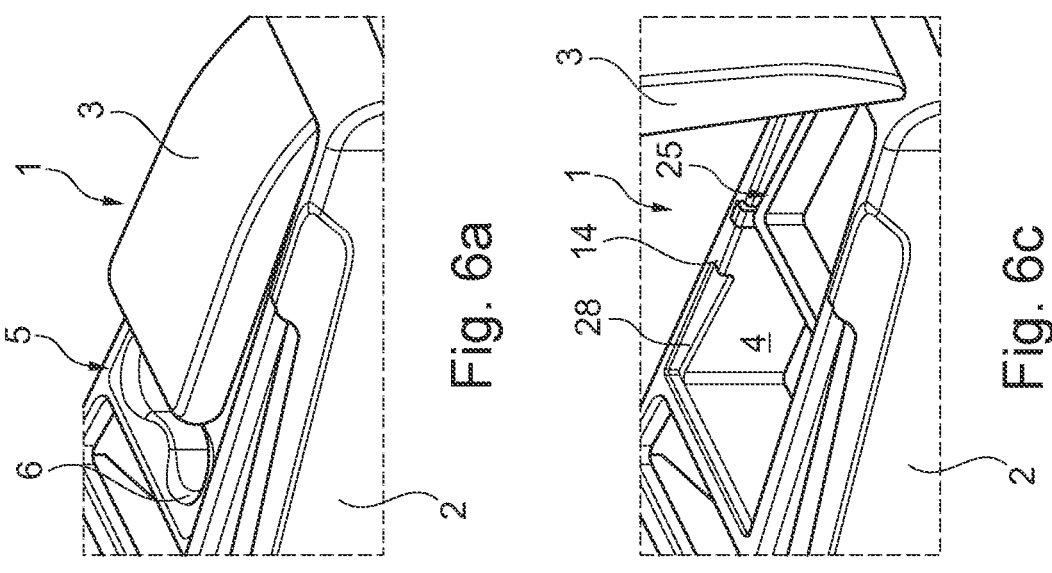
Fig. 6c
Fig. 6d

CENTER CONSOLE FOR A VEHICLE

CROSS-REFERENCE TO RELATED APPLICATION

This application claims foreign priority benefits under 35 U.S.C. § 119(a)-(d) to German Application No. 102022130413.2 filed Nov. 17, 2022, which is hereby incorporated by reference in its entirety.

FIELD OF THE DISCLOSURE

The present disclosure generally relates to a center console for a vehicle, and more particularly relates to a vehicle center console having an armrest, an upwardly open storage chamber, a storage insert, and a securing unit.

BACKGROUND OF THE DISCLOSURE

Motor vehicles may be equipped with a center console. A center console of a vehicle normally extends rearwardly from a knee region between two front footwells between two front seats. Such center consoles can take a wide variety of forms, and normally have at least one functional unit, for example a beverage holder or the like. It would be desirable to provide for a center console that has a user-configurable storage space.

SUMMARY OF THE DISCLOSURE

According to a first aspect of the present disclosure, a center console for a vehicle includes an armrest arranged in a rearward region of the center console and which at a rearward end is pivotable about a pivot axis, extending transversely with respect to a longitudinal extent of the center console, between a horizontal armrest position and a vertical opening position, an upwardly open storage chamber, which is partially forwardly offset in relation to the armrest situated in the horizontal armrest position, a storage insert configured to be at least partially inserted, from above, into the storage chamber, and a securing unit arranged between a forward and/or lateral inner wall of the storage chamber and an outer wall of the storage insert for securing the storage insert within the storage chamber in a vertical direction of the center console, wherein the securing unit has a securing receptacle and a securing projection that engages into the securing receptacle, and wherein a forward end portion of the armrest situated in the horizontal armrest position lies on a rearward end portion of the storage insert that has been inserted into the storage chamber.

Embodiments of the first aspect of the present disclosure can include any one or a combination of the following features:

a clamping element arranged on the forward end portion of the armrest and/or on the rearward end portion of the storage insert via which the forward end portion of the armrest situated in the horizontal armrest position lies on the rearward end portion of the storage insert that has been inserted into the storage chamber;

a resiliently elastic preload element arranged between a rearward side wall projection of the storage chamber and an outer wall of the storage insert and which, when the storage insert has been inserted into the storage chamber, is braced between the relevant side wall projection of the storage chamber and the relevant outer wall of the storage insert;

a forward positioning projection arranged on a forward outer wall of the storage insert;

a lateral positioning projection arranged on a lateral outer wall of the storage insert;

a spacing rib arranged on a lateral outer wall of the storage insert;

a guide contour in the storage chamber along which a guide portion of the storage insert can be guided as the storage insert is inserted into the storage chamber;

a storage insert designed as a beverage holder or as a stowage compartment; and a storage chamber extending as far as into a rearward region of the center console situated under the armrest situated in its horizontal armrest position, wherein at least one further storage insert is at least partially inserted, from above, into the rearward portion of the storage chamber situated under the armrest situated in its horizontal armrest position, such that the further storage insert is rearwardly offset in relation to the storage insert that has been inserted into a forward portion of the storage chamber, and wherein the further storage insert can be selectively inserted instead of the storage insert into the forward portion of the storage chamber.

According to a second aspect of the present disclosure, a center console for a vehicle includes an armrest arranged in a rearward region of the center console and which at a rearward end is pivotable about a pivot axis, extending transversely with respect to a longitudinal extent of the center console, between a horizontal armrest position and a vertical opening position, an upwardly open storage chamber, which is partially forwardly offset in relation to the armrest situated in the horizontal armrest position, a storage insert configured to be at least partially inserted, from above, into the storage chamber, a securing unit arranged between a forward and/or lateral inner wall of the storage chamber and an outer wall of the storage insert for securing the storage insert within the storage chamber in a vertical direction of the center console, wherein the securing unit has a securing receptacle and a securing projection that engages into the securing receptacle, and wherein a forward end portion of the armrest situated in the horizontal armrest position lies on a rearward end portion of the storage insert that has been inserted into the storage chamber, a clamping element arranged on the forward end portion of the armrest and/or on the rearward end portion of the storage insert via which the forward end portion of the armrest situated in the horizontal armrest position lies on the rearward end portion of the storage insert that has been inserted into the storage chamber, and a resiliently elastic preload element arranged between a rearward side wall projection of the storage chamber and an outer wall of the storage insert and which, when the storage insert has been inserted into the storage chamber, is braced between the relevant side wall projection of the storage chamber and the relevant outer wall of the storage insert.

Embodiments of the second aspect of the present disclosure can include any one or a combination of the following features:

a forward positioning projection arranged on a forward outer wall of the storage insert;

a lateral positioning projection arranged on a lateral outer wall of the storage insert;

a spacing rib arranged on a lateral outer wall of the storage insert;

a guide contour in the storage chamber, along which a guide portion of the storage insert can be guided as the storage insert is inserted into the storage chamber;

a storage insert designed as a beverage holder or as a stowage compartment; and a storage chamber extending as far as into a rearward region of the center console situated under the armrest situated in its horizontal armrest position, wherein at least one further storage insert is at least partially inserted, from above, into the rearward portion of the storage chamber situated under the armrest situated in its horizontal armrest position, such that the further storage insert is rearwardly offset in relation to the storage insert that has been inserted into a forward portion of the storage chamber, and wherein the further storage insert can be selectively inserted instead of the storage insert into the forward portion of the storage chamber.

BRIEF DESCRIPTION OF THE DRAWINGS

In the drawings:

FIG. 6*a* is a schematic and perspective illustration of a further exemplary embodiment of a center console in a first configuration;

FIG. 6*b* is a schematic and perspective illustration of the center console shown in FIG. 6*a*, in an opened state;

FIG. 6*c* is a schematic and perspective illustration of the center console shown in FIG. 6*b*, with a storage inset having been removed;

FIG. 6*d* is a schematic and perspective illustration of the center console shown in FIG. 6*c*, with a further storage insert in an offset position.

DETAILED DESCRIPTION OF THE PREFERRED EMBODIMENTS

In the various figures, identical parts are always denoted by the same reference designations, for which reason said parts will generally also be described only once.

Figure 1A:
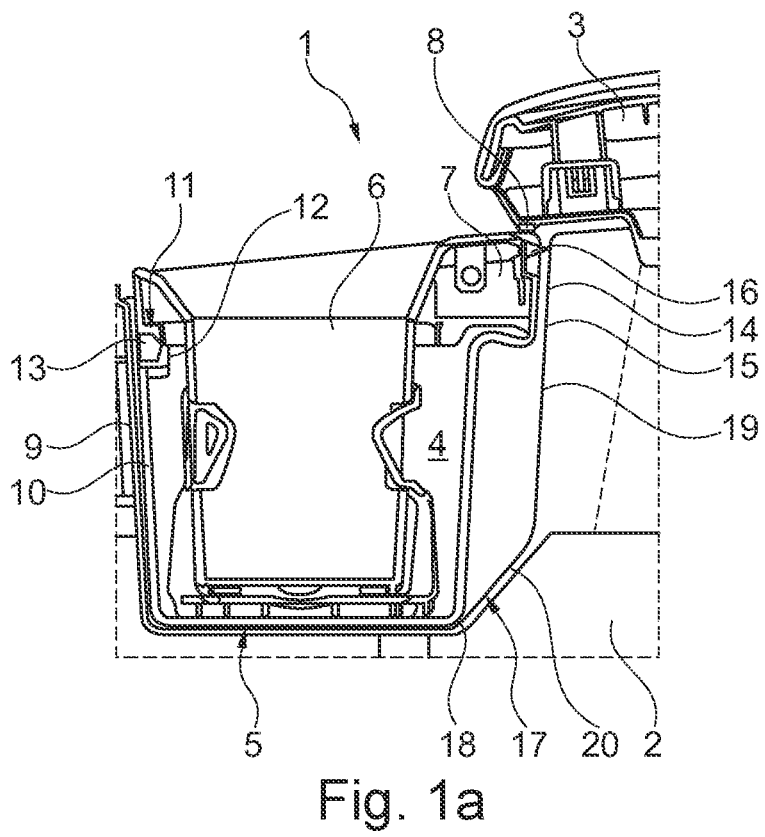
FIG. 1*a* is a schematic longitudinal sectional illustration of an exemplary embodiment of a center console.

FIG. 1*a* is a schematic longitudinal sectional illustration of an exemplary embodiment of a center console 1 according to one embodiment for a vehicle that is not shown. The center console 1 has a main body 2 on which an armrest 3 is provided, the armrest 3 being arranged in a rearward region of the center console 1 and being pivotable at a rearward end about a pivot axis (not shown), which extends or runs transversely with respect to a longitudinal extent of the center console 1 that is parallel to the plane of the drawing shown in FIG. 1*a*, between the horizontal armrest position shown in FIG. 1*a* and a vertical opening position as shown in FIGS. 6*b* to 6*d*.

The center console 1 furthermore has an upwardly open storage chamber 4 which is partially forwardly offset in relation to the armrest 3 situated in the horizontal armrest position. The storage chamber 4 extends rearwardly as far as into a rearward region of the center console 1 situated under the armrest 3 situated in its horizontal armrest position.

The center console 1 furthermore has a storage insert 5 which has been at least partially inserted, from above, into the storage chamber 4. The storage insert 5 is configured as a beverage holder, for example with two laterally mutually adjacent holding receptacles 6, of which only one holding receptacle 6 is shown in FIG. 1*a*. The storage insert 5 has, at its upper end, a rearward collar 7 which forms a rearward end portion of the storage insert 5, on which a forward end portion of the armrest 3 situated in the horizontal armrest position lies. The storage insert 5 is thus, at a rearward end, secured in the storage chamber 4 in a vertical direction of the center console 1 by means of the armrest 3.

On the forward end portion of the armrest 3, there is arranged at least one clamping element 8 via which the forward end portion of the armrest 3 situated in the horizontal armrest position lies on the rearward end portion of the storage insert 5 that has been inserted into the storage chamber 4. Alternatively or in addition, the clamping element 8 may be arranged on the rearward end portion of the storage insert 5, as shown in FIG. 2.

The center console 1 furthermore has two securing units 11 arranged between a forward inner wall 9 of the storage chamber 4 and a forward outer wall 10 of the storage insert 5, said securing units serve to secure the storage insert 5, at a forward end, within the storage chamber 4 in the vertical direction of the center console 1, wherein only one of the two securing units 11 is shown in FIG. 1*a*.

Figure 1B:
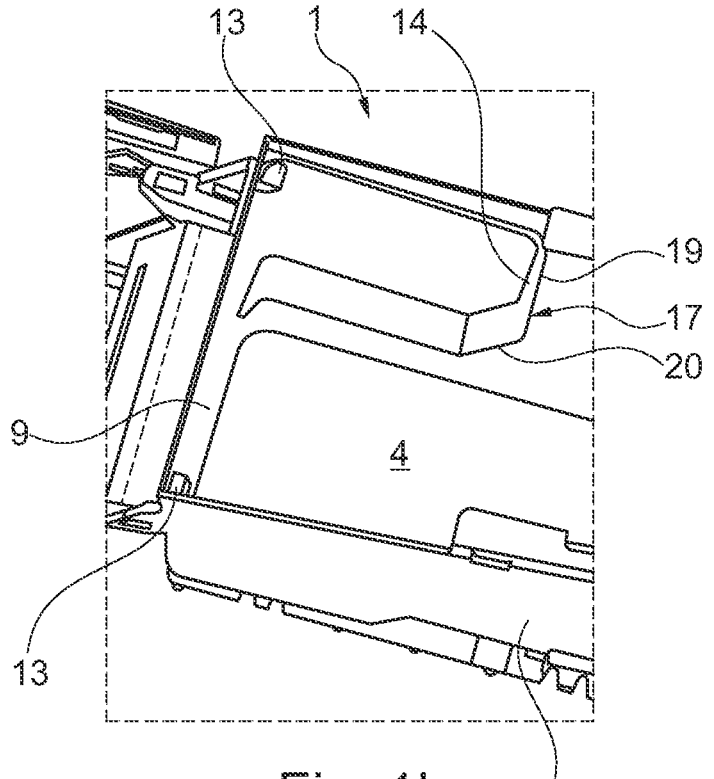
FIG. 1*b* is a schematic and perspective illustration, obliquely from above, of the center console shown in FIG. 1.
Figure 2A:
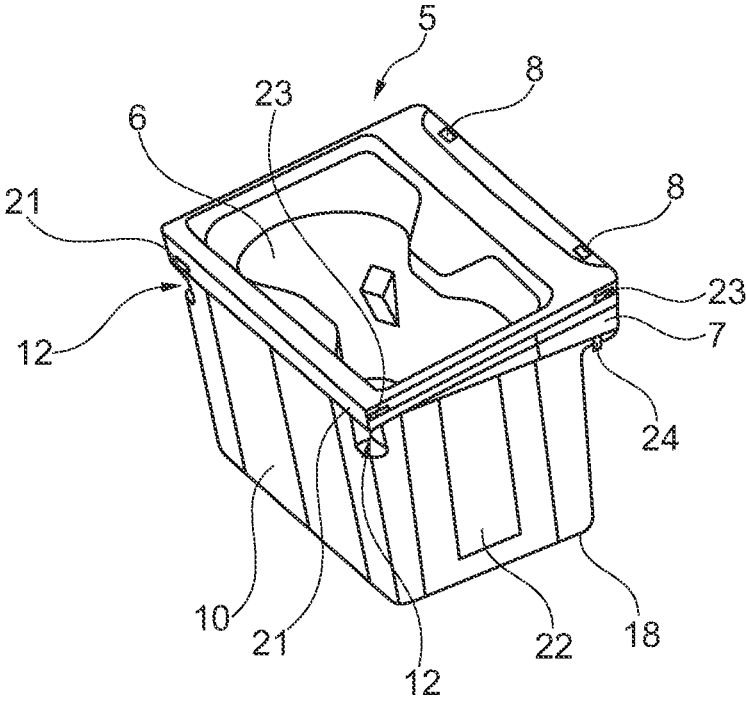
FIG. 2*a* is a schematic and perspective illustration, obliquely from above, of the storage insert shown in FIG. 1.

Each securing unit 11 is arranged in an upper region of the storage chamber 4 and has a securing receptacle 12, arranged on the forward outer wall 10 of the storage insert 5, and a securing projection 13, which is arranged on the forward inner wall 9 of the storage chamber 4 and which engages into the securing receptacle 12. Each securing unit 11 is arranged laterally with respect to a width of the center console 1 or storage chamber 4, or in a forward corner region of the storage chamber 4, as shown in FIG. 1*b*. The securing receptacles 12 are arranged at forward corner regions of the storage insert 5, as shown in FIG. 2*a*.

Furthermore, the center console 1 has at least one resiliently elastic preload element 16 which is arranged between a rearward side wall projection 14 of the storage chamber 4 and a rearward outer wall 15 of the storage insert 5 and which is braced between the rearward inner wall projection 14 of the storage chamber 4 and the rearward outer wall 15 of the storage insert 5.

Figure 4:
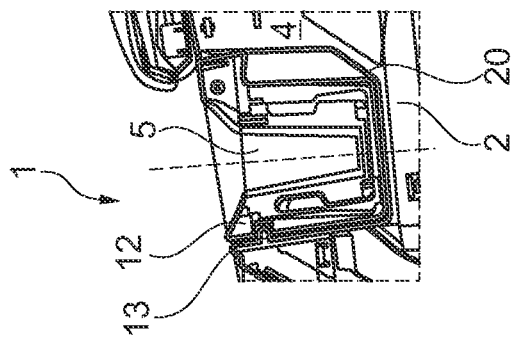
FIG. 4 shows schematic longitudinal sectional illustrations of an insertion process for inserting the storage insert shown in FIGS. 1 and 2 into the storage chamber.
Figure 4:
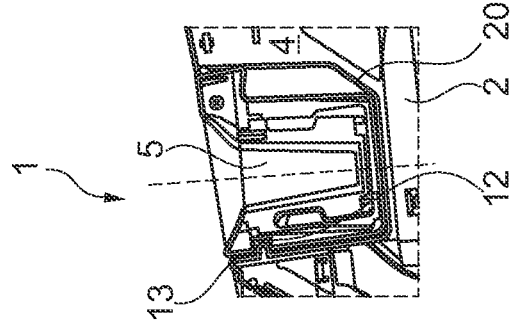
Figure 4:
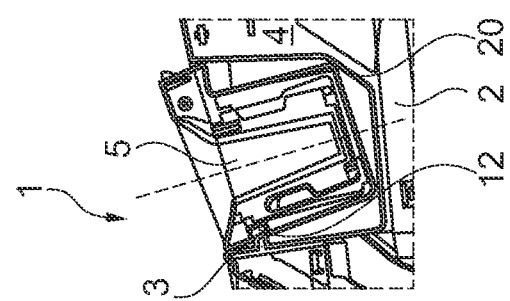
Figure 4:
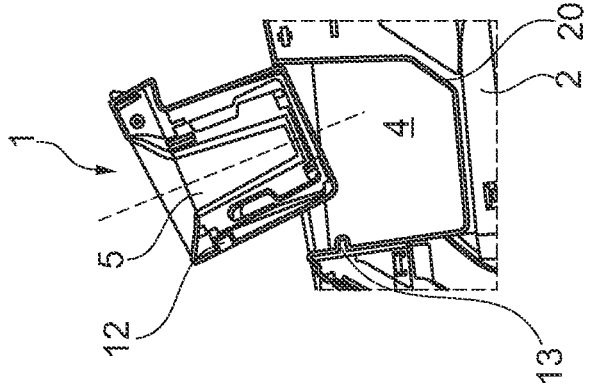

Arranged laterally in the storage chamber 4 are two guide contours 17, of which only one guide contour 17 is shown in FIGS. 1*a* and 1*b* and along which a rounded guide portion 18 of the storage insert 5 can be guided as the storage insert 5 is inserted into the storage chamber 4, as shown in FIG. 4. The guide contour 17 has a vertical guide portion 19, which also forms the rearward inner wall 14 of the storage chamber 4, and a rearwardly inclined guide portion 20, which downwardly adjoins said vertical guide portion.

FIG. 1*b* is a schematic and perspective illustration, obliquely from above, of the center console 1 shown in FIG. 1, wherein the storage insert 5 shown in FIG. 1*a* has been removed. In particular, one of the two lateral guide contours 17 is shown. Also shown are the two securing projections 13 of the securing units 11, which are arranged in forward corner regions of the storage chamber 4.

FIG. 2*a* is a schematic and perspective illustration, obliquely from above, of the storage insert 5 shown in FIG. 1. It is possible to see the securing receptacles 12, which are arranged in forward corner regions of the storage insert 5.

Also shown are two laterally mutually spaced, resiliently elastic forward positioning projections 21 of the storage insert 5, which are arranged on the forward outer wall 10 of the storage insert 5. Furthermore, two laterally mutually spaced, resiliently elastic lateral positioning projections 23 are arranged on each lateral outer wall 22 of the storage insert 5. Furthermore, two laterally mutually spaced, resiliently elastic spacing elements 24, of which only one spacing element 24 is shown in FIG. 2, are arranged on an underside of the rearward collar 7 of the storage insert 5. The positioning projections 21 and 23 and the spacing elements 24 can compensate for manufacturing tolerances, and prevent noise from being generated when relative movements occur between the storage insert 5 and the main body 2 of the center console 1 while the vehicle is in motion.

Figure 2B:
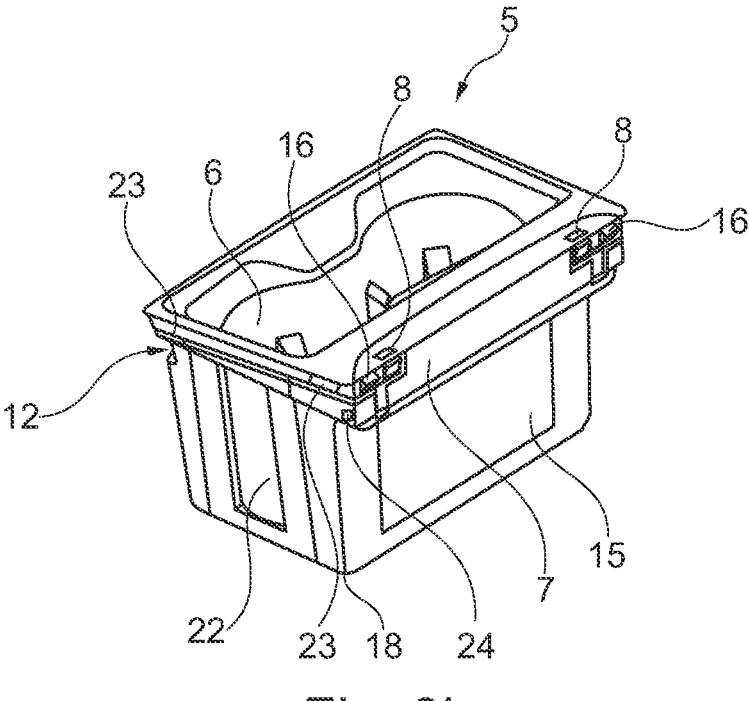
FIG. 2*b* is a further schematic and perspective illustration, obliquely from above, of the storage insert shown in FIG. 1.

FIG. 2*b* is a further schematic and perspective illustration, obliquely from above, of the storage insert 5 shown in FIG. 1. In particular, the two rearward preload elements 16 of the storage insert 5 are shown. The preload elements 16 are advantageously each arranged, as shown, on the outside of corner regions of the storage insert 5, and each bear against the side wall projections 14.

Figure 3A:
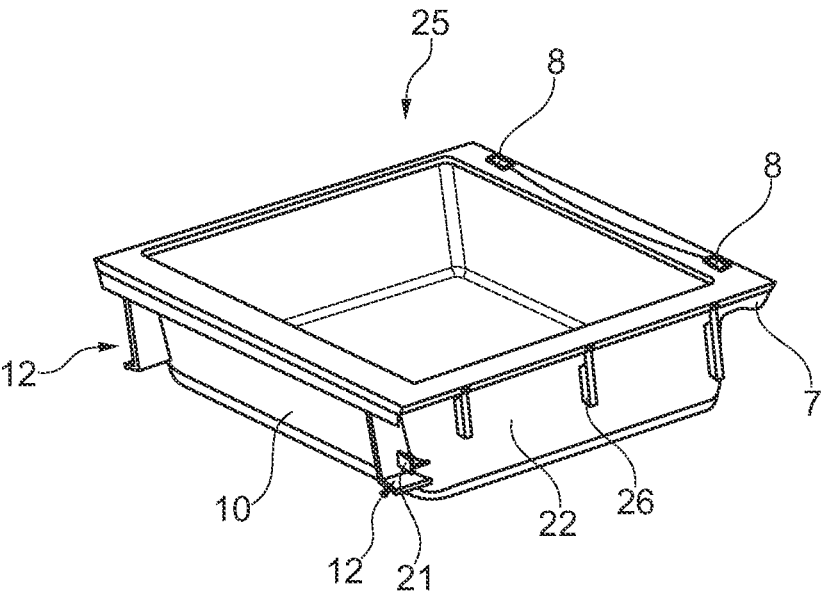
FIG. 3*a* is a schematic and perspective illustration, obliquely from above, of a further storage insert for the center console shown in FIG. 1.
Figure 5:
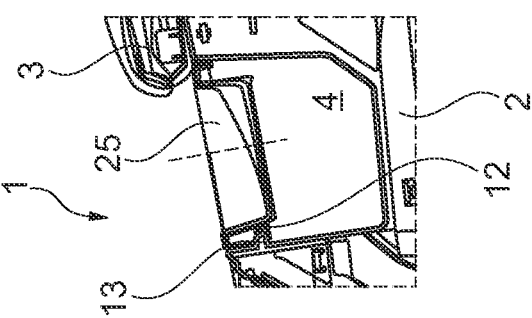
FIG. 5 shows schematic longitudinal sectional illustrations of an insertion process for inserting the further storage insert shown in FIG. 3 into the storage chamber.
Figure 5:
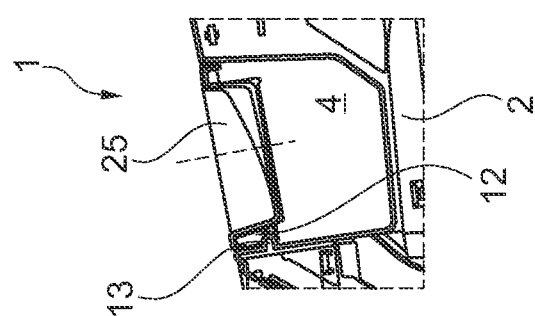
Figure 5:
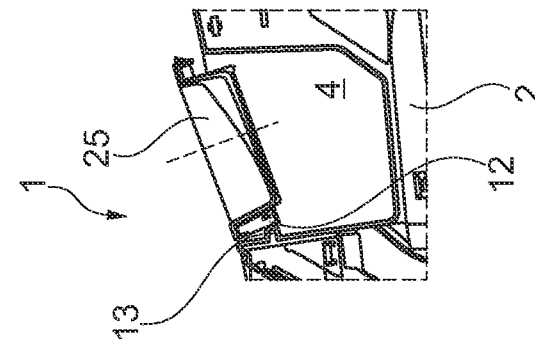
Figure 5:
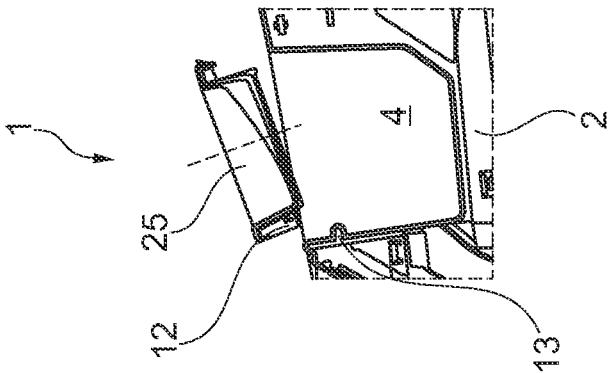

FIG. 3*a* is a schematic and perspective illustration, obliquely from above, of a further storage insert 25 for the center console shown in FIG. 1. By contrast to the exemplary embodiment shown in FIGS. 1 and 2, the storage insert 25 is configured as a stowage compartment. The storage insert 25 can, as shown in FIG. 5, be inserted instead of the storage insert 5 shown in FIGS. 1 and 2 into the storage chamber 4 shown in FIG. 1.

Two damping elements 8 are arranged, so as to be laterally mutually spaced, on a rearward collar 7 or on a rearward end portion, formed by said collar, of the storage insert 25, via which damping elements the forward end portion of the armrest situated in the horizontal armrest position and shown in FIG. 1*a* lies on the rearward end portion of the storage insert 25 that has been inserted into the storage chamber shown in FIG. 1. As can be seen from the figures, the rearward collars 7 of the storage insert 5, on the one hand, and of the storage insert 25, on the other hand, are of different design. In particular, the rearward collar 7 of the storage insert 5 is of greater vertical extent than the rearward collar 7 of the storage insert 25.

Figure 3B:
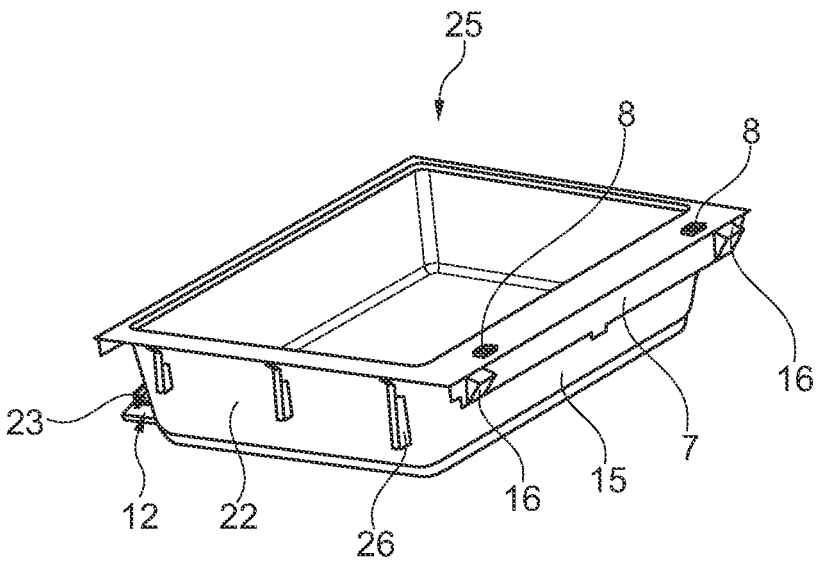
FIG. 3*b* is a further schematic and perspective illustration, obliquely from above, of the further storage insert for the center console shown in FIG. 3*a;*

Two resiliently elastic preload elements 16, shown in FIG. 3*b*, are arranged on a rearward outer wall 15 of the storage insert 25. Two laterally mutually spaced, clastic forward positioning projections 21 are arranged on a forward outer wall 10 of the storage insert 25. Two laterally mutually spaced, elastic lateral positioning projections 23 are arranged on each lateral outer wall 22 of the storage insert 25. Furthermore, by way of example, three elastic spacing ribs 26 with different vertical extents are arranged on each lateral outer wall 22 of the storage insert 25, which spacing ribs define the depth to which the storage insert 25 is inserted, but also have a noise-deadening action. These spacing ribs 26 will be discussed once again with regard to FIG. 6. Furthermore, two securing receptacles 12 are formed in the corners on the forward outer wall 10 of the storage insert 25.

FIG. 4 shows schematic longitudinal sectional illustrations of an insertion process for inserting the storage insert 5 shown in FIGS. 1 and 2 into the storage chamber 4. The armrest 3 is firstly moved into its vertical opening position. The storage insert 5 is subsequently inserted, in an inclined position and from above, into the storage chamber 4, as shown in the left-hand illustration of FIG. 4, until the securing projections 13 engage into the securing receptacles 12, as shown in the second illustration from the left in FIG. 4. The storage insert 5 is thereafter pivoted about the securing unit 11, wherein the guide portion 18 is guided along the guide portion 20 of the guide contour 17 of the storage chamber 4 until the state shown in the second illustration from the right in FIG. 4 is attained. Finally, the armrest 3 is pivoted into the horizontal armrest position, as shown in the right-hand illustration of FIG. 4. The storage insert 5 can be removed from the storage chamber 4 by reversing the sequence of these steps.

FIG. 5 shows schematic longitudinal sectional illustrations of an insertion process for inserting the further storage insert 25 shown in FIG. 3 into the storage chamber 4. The armrest 3 is firstly moved into its vertical opening position. The storage insert 25 is subsequently inserted, in an inclined position and from above, into the storage chamber 4, as shown in the left-hand illustration of FIG. 5, until the securing projections 13 engage into the securing receptacles 12, as shown in the second illustration from the left in FIG. 5. The storage insert 25 is thereafter pivoted about the securing unit 11 until the state shown in the second illustration from the right in FIG. 5 is attained. Finally, the armrest 3 is pivoted into the horizontal armrest position, as shown in the right-hand illustration of FIG. 5. The storage insert 25 can be removed from the storage chamber 4 by reversing the sequence of these steps.

FIG. 6*a* is a schematic and perspective illustration of a further exemplary embodiment of a center console 1 in a first configuration. The center console 1 differs from the exemplary embodiment shown in FIGS. 1 to 5 in that a further storage insert 25 has been at least partially inserted, from above, into the rearward portion of the storage chamber 4 situated under the armrest 3 situated in its horizontal armrest position shown in FIG. 6*a* such that the further storage insert 25 is rearwardly offset in relation to the storage insert 5 that has been inserted into a forward portion of the storage chamber 4, as shown in FIG. 6*b*. Here, the storage insert 25 is stably supported, rotationally offset by 90° in relation to the storage insert 5, that is to say longitudinally, so to speak, in the rearward portion of the storage chamber 4, by virtue of the storage insert 25 being held on corresponding clamping devices 27 which are arranged on the side walls of the rearward portion of the storage chamber 4. The clamping devices 27 may interact, at least on one side, with one of the preload elements 16. Here, the clamping devices are arranged and designed such that they do not make contact with any relatively large articles, such as bags or the like, which are stored in the rearward portion of the storage chamber 4. Rather, the projecting preload elements 16 bear against the clamping devices 27, which can also deflect such that the storage inserts 5 or 25 stored in the rearward portion of the storage chamber 4 are effectively spring-loaded. It is thus also evident that, in this exemplary embodiment, the forward portion of the storage chamber 4 is wider than the rearward portion, wherein the storage chamber 4 effectively conically tapers slightly toward the rearward side.

Figure 7:
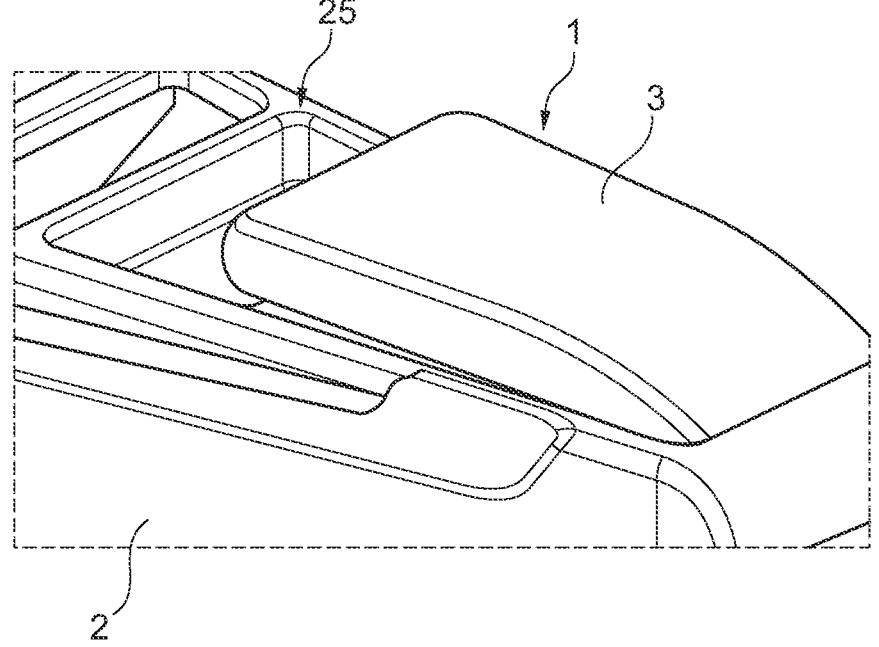
FIG. 7 is a schematic and perspective illustration of the center console shown in FIG. 6*d*, in a closed state

In FIG. 6c, the storage insert 5 has been removed from the storage chamber 4. It is possible to see lateral bearing shoulders 28 which are inclined so as to slope downward from the forward side in the direction of the rearward side of the storage chamber 4 and which end at the side wall projection 14. The further storage insert 25 can subsequently be removed from the rearward portion of the storage chamber 4, rotated through 90° about a vertical axis, and inserted in this state into the forward portion of the storage chamber 4, as shown in FIG. 6d. By virtue of the spacing ribs 26 being arranged on the storage insert 25, it is possible by way of their different vertical extents to ensure a flush termination with the top edge of the relevant side wall of the storage chamber 4. In FIG. 6d, it can be seen by way of example that the storage insert 25 is supported so as to be slightly rearwardly inclined, with spacing ribs having been omitted. The inclination of the storage insert 25 can ensure that articles stored therein are always moved toward the rear. The spacing ribs 26 may self-evidently also be designed such that the storage insert 25 terminates flush with the top edges of the storage chamber 4, that is to say is stored horizontally in the storage chamber 4, as is apparent for example from the far right-hand image in FIG. 5. The preload elements 16, which are arranged on the (relatively small) rearward collar 7 of the storage insert 25, can come into contact with the side wall projection 14. The storage insert 5 can then be inserted into the rearward portion of the storage chamber 4, and, like the storage insert 25 before, stored there longitudinally, so to speak, and held stably. The storage insert 5 may self-evidently be supported at some other location. The center console 1 or the rearward portion of the storage chamber 4 may finally be closed by virtue of the armrest 3 being pivoted into its horizontal armrest position, as shown in FIG. 7.

What is evident here is the adaptable use of the center console that is desired by the user, since the user can freely decide what storage insert is to be arranged in the forward portion of the storage chamber 4, with the selection being reversible at any time. The forward portion of the storage chamber 4 may self-evidently also be kept free from any storage inserts, as may the rearward portion. The storage inserts are then stored at some suitable location in the vehicle or externally, but can be reused at any time.

According to the disclosure, a center console is provided, according to which a forward end portion of the armrest situated in the horizontal armrest position lies on a rearward end portion of the storage insert that has been inserted into the storage chamber.

The features and measures individually specified in the description may be combined with one another in any technically meaningful way and reveal further refinements of the center console. The description additionally characterizes and specifies the center console, in particular in conjunction with the figures.

According to the disclosure, the rearward end portion of the storage insert that has been inserted, from above, into the storage chamber is secured in a vertical direction of the center console by use of the forward end portion of the armrest situated in the horizontal armrest position, by virtue of the forward end portion of the armrest situated in the horizontal armrest position lying on the rearward end portion of the storage insert that has been inserted into the storage chamber and thus holding down the rearward end portion of the storage insert. In this way, the storage insert can be held in the storage chamber without creaking or rattling while the vehicle is in motion. Furthermore, by use of this securing action by way of the armrest, manufacturing tolerances can be compensated by virtue of the armrest exerting a contact pressure on the rearward end portion of the storage insert. Furthermore, the storage insert is secured in the storage chamber even during an extreme event, thus preventing it from becoming detached and from being moved around in an uncontrolled manner.

The expressions "rearward" and "forward" relate to the vehicle in which the center console is installed, such that the center console has a forward end and a rearward end.

If the storage insert is removed from the storage chamber, the center console offers a larger storage volume for storing relatively large articles, such as bags or the like. Therefore, no fasteners such as openings or pushbuttons, which could come into contact with a material, a zip or the like of a bag arranged in the storage chamber should be present in the storage chamber. According to one embodiment, such fasteners can be omitted because the storage insert that has been inserted into the storage chamber is stably fastened on the rest of the center console exclusively by the at least one securing unit, at a forward end, and by the armrest, at a rearward end. No additional fasteners are required.

The armrest arranged in the rearward region of the center console, when in its horizontal armrest position in which the armrest performs its actual armrest function, covers a rearward portion of the storage chamber, such that a storage space provided by the storage insert is fully accessible from above. When in its vertical opening position, the armrest partially or entirely opens up the rearward portion of the storage chamber, such that the rearward portion of the storage chamber can be used to store at least one article while the storage insert is at the same time situated in a forward portion of the storage chamber. The storage chamber is thus partially forwardly offset in relation to the armrest situated in the horizontal storage position, and may extend rearward as far as under the armrest.

The storage insert may be configured as an upwardly open container, for example as a beverage holder, stowage compartment or the like. For example, the storage insert may be configured as a beverage holder with two holding receptacles which are arranged laterally with respect to one another and are spaced from one another and between which a narrowed portion of the storage space of the storage insert is formed.

The storage insert can, at a forward end and/or laterally, be secured within the storage chamber in a vertical direction by the securing unit. For this purpose, the securing receptacle may be arranged on a forward outer wall of the storage insert and/or on a side wall of the storage insert laterally adjoining the outer wall, while the securing projection may be arranged on a forward inner wall of the storage chamber and/or on a side wall of the storage chamber laterally adjoining the inner wall. Alternatively, the securing projection may be arranged on a forward outer wall of the storage insert and/or on a side wall of the storage insert laterally adjoining the outer wall, while the securing receptacle may be arranged on a forward inner wall of the storage chamber and/or on a side wall of the storage chamber laterally adjoining the inner wall. The securing unit may for example be arranged centrally, at a forward end, between the forward outer wall of the storage insert and the forward inner wall of the storage chamber, or may be arranged in a forward corner region of the storage chamber, or may extend, at a forward end, over substantially the width of the storage insert.

As the storage insert is inserted, from above, into the storage chamber, the securing projection is inserted into the securing receptacle, for which purpose the storage insert is held in an inclined position. The storage insert can subsequently be pivoted, by way of the joint correspondingly formed by the securing unit, for example until a base of the storage insert comes to lie on a bearing portion, provided for this purpose, of the storage chamber, or until the rearward end portion of the storage insert lies on at least one bearing portion of the center console. The armrest can finally be pivoted from its vertical opening position, into which it has been moved before the commencement of the insertion of the storage insert into the storage chamber from above, into a horizontal armrest position, such that the forward end portion of the armrest lies indirectly or directly on the rearward end portion of the storage insert and thus secures the storage insert, at the rearward end, in the storage chamber. The storage insert can be removed from the storage chamber again by performing these operations in the opposite sequence.

The center console may be installed in a vehicle in the form of a motor vehicle, for example a passenger motor vehicle or utility motor vehicle. Such a vehicle therefore constitutes a further aspect according to the disclosure.

In one advantageous embodiment, on the forward end portion of the armrest and/or on the rearward end portion of the storage insert, there is arranged at least one damping element via which the forward end portion of the armrest situated in the horizontal armrest position lies on the rearward end portion of the storage insert that has been inserted into the storage chamber. Manufacturing tolerances in a vertical direction of the center console can thus be compensated by virtue of the damping element being compressed to a greater or lesser degree when the armrest is situated in its horizontal armrest position. This furthermore prevents noises from being generated as a result of relative movements between the storage insert and the armrest while the vehicle is in motion. The damping element may for example be resiliently elastic or formed as a felt pad.

In a further advantageous embodiment, the center console has at least one resiliently elastic preload element which is arranged between a rearward side wall projection of the storage chamber and a rearward outer wall of the storage insert and which, when the storage insert has been inserted into the storage chamber, is braced between the relevant side wall projection of the storage chamber and the relevant outer wall of the storage insert. Manufacturing tolerances in a longitudinal direction of the center console can thus be compensated by virtue of the resiliently elastic preload element being compressed to a greater or lesser degree when the storage insert has been inserted into the storage chamber. This furthermore prevents noises from being generated as a result of relative movements between the storage insert and the armrest while the vehicle is in motion. Alternatively, at least one felt pad may be correspondingly provided instead of the resiliently elastic preload element.

In a further advantageous embodiment, at least one forward positioning projection is arranged on a forward outer wall of the storage insert. By way of the forward positioning projection, the storage insert is supported forwardly on the forward inner wall of the storage chamber. Here, the positioning projection may be resiliently elastic or formed as a felt pad. Manufacturing tolerances in a longitudinal direction of the center console can thus be compensated by virtue of the forward positioning projection being compressed to a greater or lesser degree when the storage insert has been inserted into the storage chamber. This furthermore prevents noises from being generated as a result of relative movements between the storage insert and the armrest while the vehicle is in motion.

In a further advantageous embodiment, at least one lateral positioning projection is arranged on at least one lateral outer wall of the storage insert. By way of the lateral positioning projection, the storage insert is supported laterally on the lateral inner wall of the storage chamber. Here, the lateral positioning projection may be resiliently elastic or formed as a felt pad. Manufacturing tolerances in a transverse direction of the center console can thus be compensated by virtue of the lateral positioning projection being compressed to a greater or lesser degree when the storage insert has been inserted into the storage chamber. This furthermore prevents noises from being generated as a result of relative movements between the storage insert and the armrest while the vehicle is in motion. It is also possible for in each case at least one corresponding lateral positioning projection to be arranged on each lateral outer wall of the storage insert.

In a further advantageous embodiment, at least one spacing rib is arranged on at least one lateral outer wall of the storage insert. The depth to which the storage insert is inserted into the storage chamber is thus defined. Within the storage chamber, there may be arranged at least one bearing shoulder, on top of which the spacing rib is seated when the storage insert has been inserted into the storage chamber as intended. Here, the spacing rib may for example be resiliently elastic. Manufacturing tolerances in a vertical direction of the center console can thus be compensated by virtue of the spacing rib being compressed to a greater or lesser degree when the storage insert has been inserted into the storage chamber. This furthermore prevents noises from being generated as a result of relative movements between the storage insert and the armrest while the vehicle is in motion. It is also possible for in each case at least one corresponding spacing rib to be arranged on each lateral outer wall of the storage insert. In one embodiment, multiple mutually spaced spacing ribs may be provided on the lateral outer walls, which spacing ribs differ in terms of their vertical extent in order to thus compensate as necessary for an inclination of the bearing shoulder, in addition to the aforementioned effects.

In a further advantageous embodiment, in the storage chamber, there is arranged at least one guide contour along which a guide portion of the storage insert can be guided as the storage insert is inserted into the storage chamber. This can assist the user when inserting the storage insert into the storage chamber as intended in the manner described above, such that the securing projection remains engaged with the securing receptacle during the insertion process. The guide contour may for example be arranged on at least one longitudinal side of the storage chamber. The guide portion of the storage insert may be formed by a rounded lower rearward portion of the storage insert.

In a further advantageous embodiment, the storage chamber extends as far as into a rearward region of the center console situated under the armrest situated in its horizontal armrest position, wherein at least one further storage insert is at least partially inserted, from above, into the rearward portion of the storage chamber situated under the armrest situated in its horizontal armrest position, such that the further storage insert is rearwardly offset in relation to the storage insert that has been inserted into a forward portion of the storage chamber, and wherein the further storage insert can be selectively inserted instead of the storage insert into the forward portion of the storage chamber. The center console can thus be user-configured as required. Here, the storage chamber may be configured such that the further storage insert, when inserted into the forward portion of the storage chamber, is rotationally offset by 90° about a vertical axis in relation to its state when it is inserted into the rearward portion of the storage chamber.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A center console for a vehicle, the center console comprising:

an armrest arranged in a rearward region of the center console and which at a rearward end is pivotable about a pivot axis, extending transversely with respect to a longitudinal extent of the center console, between a horizontal armrest position and a vertical opening position;

an upwardly open storage chamber, which is partially forwardly offset in relation to the armrest situated in the horizontal armrest position;

a storage insert configured to be at least partially inserted, from above, into the storage chamber;

a securing unit arranged between a forward and/or lateral inner wall of the storage chamber and an outer wall of the storage insert for securing the storage insert within the storage chamber in a vertical direction of the center console, wherein the securing unit has a securing receptacle and a securing projection that engages into the securing receptacle, and wherein a forward end portion of the armrest situated in the horizontal armrest position lies on a rearward end portion of the storage insert that has been inserted into the storage chamber; and a resiliently elastic preload element arranged between a rearward side wall projection of the storage chamber and an outer wall of the storage insert and which, when the storage insert has been inserted into the storage chamber, is braced between the rearward side wall projection of the storage chamber and the outer wall of the storage insert.

2. The center console according to claim 1, further comprising a clamping element arranged on the forward end portion of the armrest and/or on the rearward end portion of the storage insert via which the forward end portion of the armrest situated in the horizontal armrest position lies on the rearward end portion of the storage insert that has been inserted into the storage chamber.

3. The center console according to claim 1, further comprising a forward positioning projection arranged on a forward outer wall of the storage insert.

4. The center console according to claim 1, further comprising a lateral positioning projection arranged on a lateral outer wall of the storage insert.

5. The center console according to claim 1, further comprising a spacing rib arranged on a lateral outer wall of the storage insert.

6. The center console according to claim 1, wherein in the storage chamber there is arranged a guide contour along which a guide portion of the storage insert can be guided as the storage insert is inserted into the storage chamber.

7. The center console according to claim 1, wherein the storage insert is designed as a beverage holder or as a stowage compartment.

8. A center console for a vehicle, the center console comprising:

an armrest arranged in a rearward region of the center console and which at a rearward end is pivotable about a pivot axis, extending transversely with respect to a longitudinal extent of the center console, between a horizontal armrest position and a vertical opening position;

an upwardly open storage chamber, which is partially forwardly offset in relation to the armrest situated in the horizontal armrest position;

a storage insert configured to be at least partially inserted, from above, into the storage chamber;

a securing unit arranged between a forward and/or lateral inner wall of the storage chamber and an outer wall of the storage insert for securing the storage insert within the storage chamber in a vertical direction of the center console, wherein the securing unit has a securing receptacle and a securing projection that engages into the securing receptacle, wherein a forward end portion of the armrest situated in the horizontal armrest position lies on a rearward end portion of the storage insert that has been inserted into the storage chamber, wherein the storage chamber extends as far as into a rearward region of the center console situated under the armrest situated in its horizontal armrest position, wherein at least one further storage insert is at least partially inserted, from above, into the rearward portion of the storage chamber situated under the armrest situated in its horizontal armrest position, such that the further storage insert is rearwardly offset in relation to the storage insert that has been inserted into a forward portion of the storage chamber, and wherein the further storage insert can be selectively inserted instead of the storage insert into the forward portion of the storage chamber.

9. A center console for a vehicle, the center console comprising:

an armrest arranged in a rearward region of the center console and which at a rearward end is pivotable about a pivot axis, extending transversely with respect to a longitudinal extent of the center console, between a horizontal armrest position and a vertical opening position;

an upwardly open storage chamber, which is partially forwardly offset in relation to the armrest situated in the horizontal armrest position;

a storage insert configured to be at least partially inserted, from above, into the storage chamber;

a securing unit arranged between a forward and/or lateral inner wall of the storage chamber and an outer wall of the storage insert for securing the storage insert within the storage chamber in a vertical direction of the center console, wherein the securing unit has a securing receptacle and a securing projection that engages into the securing receptacle, and wherein a forward end portion of the armrest situated in the horizontal armrest position lies on a rearward end portion of the storage insert that has been inserted into the storage chamber;

a clamping element arranged on the forward end portion of the armrest and/or on the rearward end portion of the storage insert via which the forward end portion of the armrest situated in the horizontal armrest position lies on the rearward end portion of the storage insert that has been inserted into the storage chamber; and a resiliently elastic preload element arranged between a rearward side wall projection of the storage chamber and an outer wall of the storage insert and which, when the storage insert has been inserted into the storage chamber, is braced between the rearward side wall projection of the storage chamber and the outer wall of the storage insert.

10. The center console according to claim 9, further comprising a forward positioning projection arranged on a forward outer wall of the storage insert.

11. The center console according to claim 10, further comprising a lateral positioning projection arranged on a lateral outer wall of the storage insert.

12. The center console according to claim 11, further comprising a spacing rib arranged on a lateral outer wall of the storage insert.

13. The center console according to claim 12, wherein in the storage chamber there is arranged a guide contour along which a guide portion of the storage insert can be guided as the storage insert is inserted into the storage chamber.

14. The center console according to claim 13, wherein the storage insert is designed as a beverage holder or as a stowage compartment.

15. The center console according to claim 14, wherein the storage chamber extends as far as into a rearward region of the center console situated under the armrest situated in its horizontal armrest position, wherein at least one further storage insert is at least partially inserted, from above, into the rearward portion of the storage chamber situated under the armrest situated in its horizontal armrest position, such that the further storage insert is rearwardly offset in relation to the storage insert that has been inserted into a forward portion of the storage chamber, and wherein the further storage insert can be selectively inserted instead of the storage insert into the forward portion of the storage chamber.

* * * * *